Figure 1:
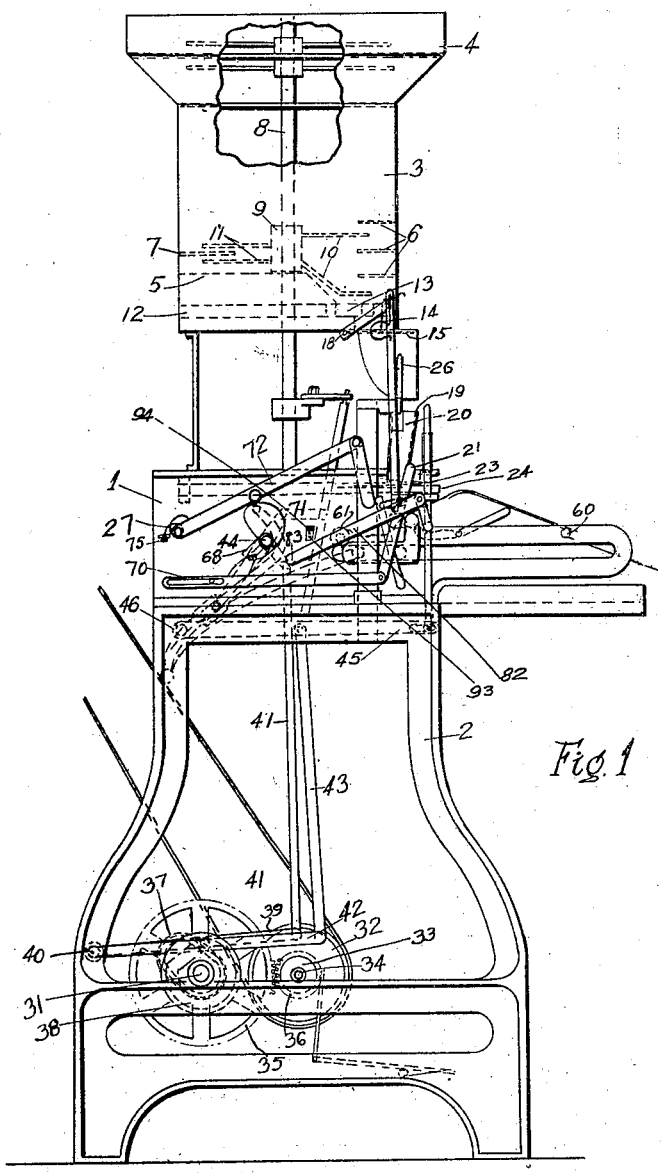

H. T. FROEHLICK.
SCRAP BUNCHING MACHINE.
APPLICATION FILED JUNE 26, 1917.

1,374,441.

Patented Apr. 12, 1921.
6 SHEETS—SHEET 1.

WITNESSES:
Fredk J. Sindelbach
Jos. G. Lewis.

INVENTOR
Harry T. Froehlick,
BY
William W. Varney
ATTORNEY

H. T. FROEHLICK.
SCRAP BUNCHING MACHINE.
APPLICATION FILED JUNE 26, 1917.

1,374,441.

Patented Apr. 12, 1921.
6 SHEETS—SHEET 6.

H. T. FROEHLICK.
SCRAP BUNCHING MACHINE.
APPLICATION FILED JUNE 26, 1917.

1,374,441.

Patented Apr. 12, 1921.
6 SHEETS—SHEET 5.

WITNESSES:
Fredk. J. Sendelbach
Jas. G. Lewis.

INVENTOR
Harry T. Froehlick
BY
William W. Varney
ATTORNEY

UNITED STATES PATENT OFFICE.

HARRY T. FROEHLICK, OF PHILADELPHIA, PENNSYLVANIA, ASSIGNOR, BY MESNE ASSIGNMENTS, TO CHARLES F. STAUFFEN, OF BALTIMORE, MARYLAND.

SCRAP-BUNCHING MACHINE.

1,374,441. Specification of Letters Patent. Patented Apr. 12, 1921.

Application filed June 26, 1917. Serial No. 177,003.

*To all whom it may concern:*

Be it known that I, HARRY T. FROEHLICK, a citizen of the United States, residing in the city of Philadelphia, in the county of Philadelphia and the State of Pennsylvania, have invented certain new and useful Improvements in Scrap-Bunching Machines, of which the following is a specification.

My invention relates to an improved scrap bunching machine; and has for its object the formation of a scrap bunch of uniform compactness and size.

A further object of my invention is the providing of an improved means in a scrap bunching machine for separating a desired mass of scrap from a superfluous mass of the same.

A further object of my invention is the providing of an improved means in a scrap bunching machine of bringing the scrap to a uniform density of compactness.

A further object of my invention is the providing of an improved means in a scrap bunching machine for separating a definite bunch of scrap from a mass of the same brought to uniform density of compactness.

A further object of my invention is the providing of improved means of automatically feeding a scrap bunching machine.

A further object of my invention is the providing of means in a scrap bunching machine for automatically approximating the mass desired and feeding the same from a supply to the bunch determining means.

A further object of my invention is the providing of improved means in a scrap bunching machine for agitating the mass of scrap being fed.

A further object of my invention is the providing of improved means in a scrap bunching machine for separating a desired mass of scrap from a superfluous mass of the same and of regulating at will the amount so separated.

A further object of my invention is the providing in a scrap bunching machine, of automatic means for separating an approximate mass of bunch desired and then automatically general averaging the masses so provided in uniform bunches.

With the foregoing and other objects in view, my invention consists of the novel construction, combination and arrangement of parts as hereinafter specifically described and illustrated in the accompanying drawings, wherein is shown the preferred embodiment of my invention, but it is understood that changes, variations and modifications can be resorted to which come within the scope of the claims hereunto appended.

Figure 2:
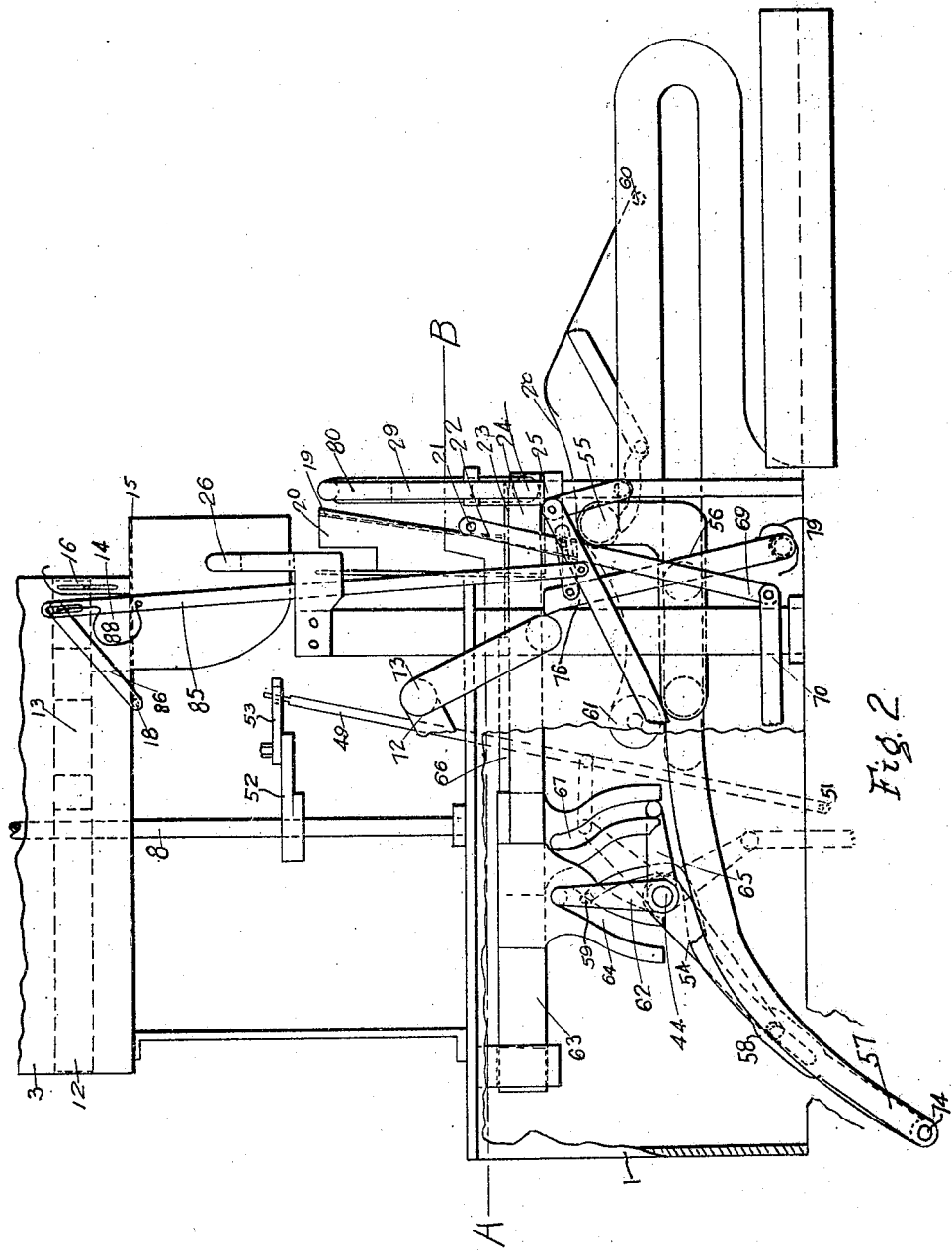
Figure 3:
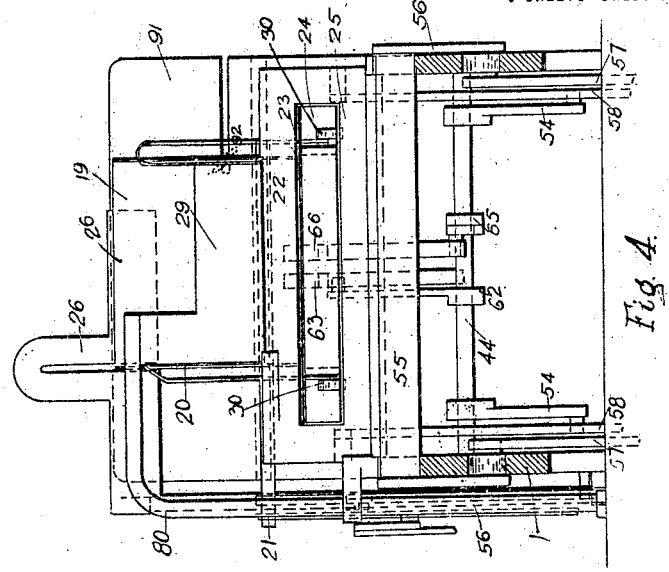
Figure 4:
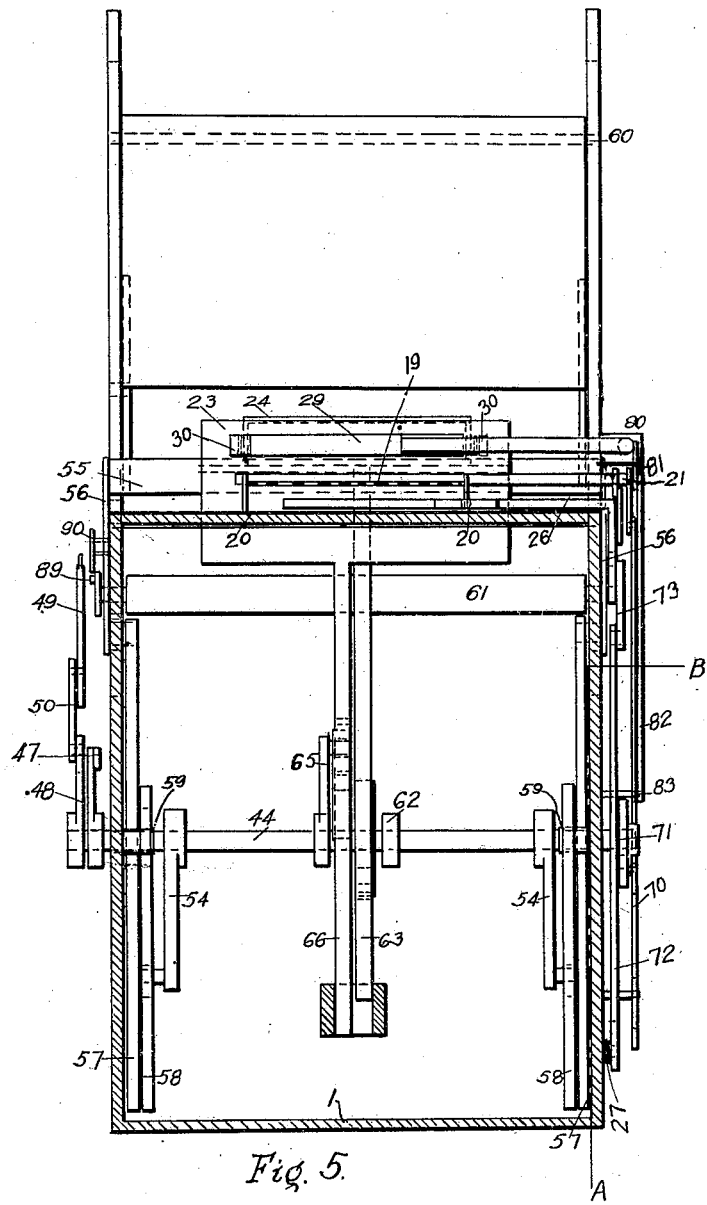
Figure 5:
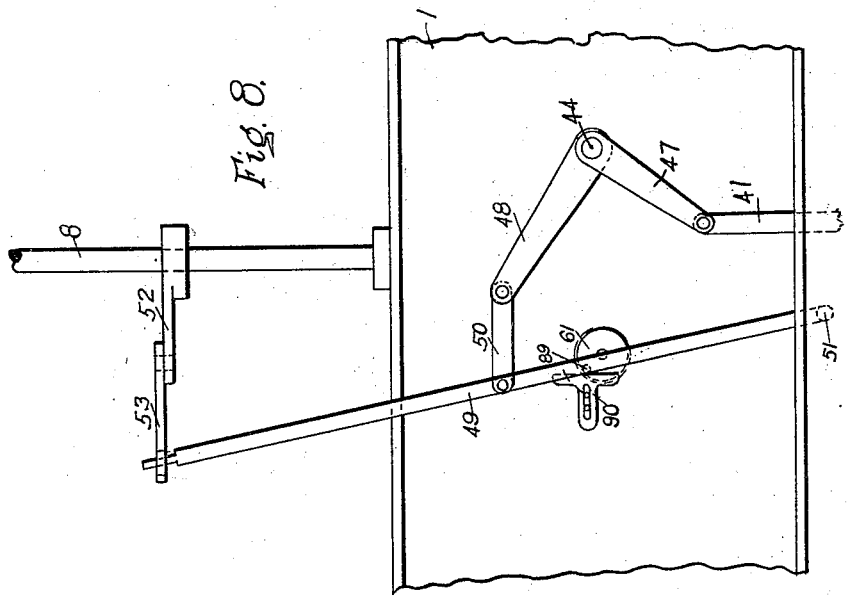
Figure 6:
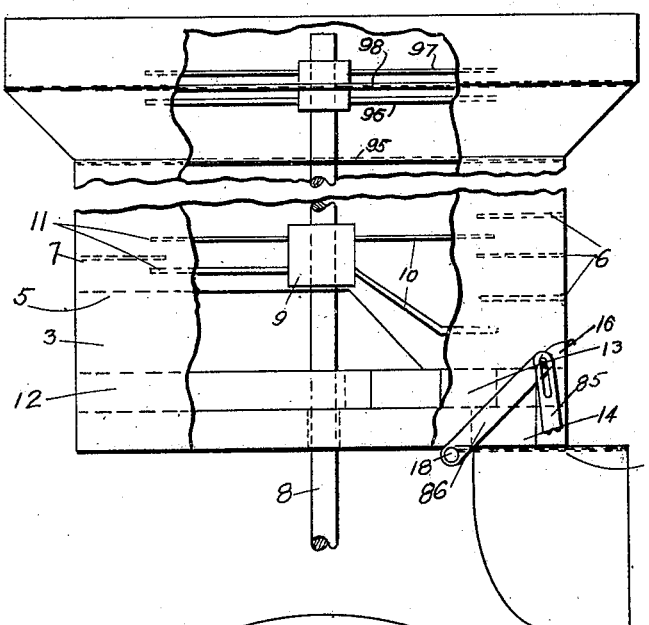
Figure 7:
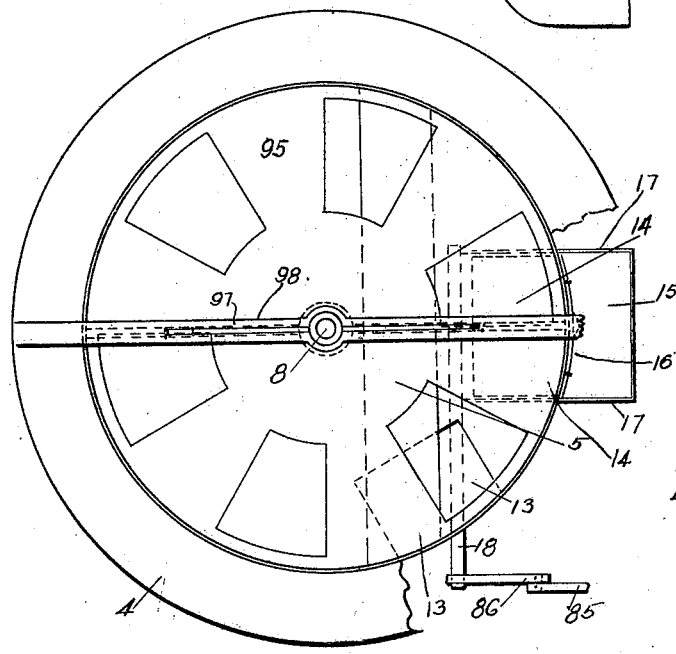

In the drawings of the herein described embodiment of my invention; Figure 1, is a view in side elevation of my improved scrap bunching machine; Fig. 2 is an enlarged view of a part of my machine shown partly in section, said view being taken in side elevation similar to Fig. 1; Fig. 3 is an enlarged view in side elevation showing more particularly the forming means the roller belt being omitted; Fig. 4 is a view in elevation, taken at right angles to that shown in Fig. 3; Fig. 5 is a sectional view taken through "AB" of Fig. 2, the roller belt being omitted; Fig. 6 is an enlarged view of the hopper in elevation, partly in section; Fig. 7 is a plan view of the hopper shown in Fig. 6 with a portion of the top part broken away; and Fig. 8 is an enlarged detail of the end of roller 61 and its adjusting mechanism and of the means of operating shaft 8.

Similar numerals refer to similar parts throughout the several views.

1 is the main frame of the bunching machine. 2 is the stand upon which the bunching machine is placed and in which the power mechanism is journaled. 3 is the hopper body provided with feeding funnel 4. 5 is the bottom of the hopper shaped to throw the contents of the hopper as it settles, into the feeding mechanism. 6 are stationary arms secured to hopper 3 on one side and 7 is a stationary arm on the other side of hopper 3. The number of arms may be varied. I have found the number shown satisfactory. 8 is a vertical shaft in hopper body 3 carrying agitator 9 secured thereon, which agitator comprises arms 10 which register between arms 6 and arms 11, sweeping the space near the bottom 5. Vertical shaft 8 oscillates sufficiently to properly agitate the tobacco. Below bottom 5 is measuring disk 12 of some considerable thickness, preferably of sufficient thickness to form a receptacle in a sector of the same in capacity to more than approximate the maximum bunch required. I have numbered the space of this receptacle 13. The oscillating of disk 12 scrapes the tobacco over and alines it with the feeding and measuring receptacle 14. Measuring disk 12 is secured to and operated by vertical shaft 8.

The feeding and measuring receptacle 14 is stationary with reference to hopper body 3 and is of such a depth as to approximate the minimum bunch required, but may be increased in size as larger bunches are required, by limiting the return movement of its bottom 15 by means of sliding member 16 which forms a prolongation of hopper body 3, thus forming one side of measuring body 14. The prolongation of the other sides form the chute sides 17. As more tobacco is required, sliding member 16 is shoved down and secured. Bottom 15 is secured to and operated by shaft 18 which is timed to dump when receptacle 13 is out of register with receptacle 14 and the parts below are in proper position to receive the charge.

19 is an oscillating throat member forming in one position, together with sides 20, a receptacle, of upwardly flaring dimensions and into which the tobacco is dumped by bottom 15, after which the tobacco is pressed by throat member 19 and the receptacle becomes larger at the bottom than at the top to facilitate the proper compressing and moving of the tobacco in and through the same. Oscillating throat member 19 is secured on shaft 21 and is operated by the same.

Below oscillating throat member 19 and shaft 21 is face 22, below which face and sides 20, one or both of said sides 20 being adjustable on face 91 to adjust the length of the bunch, knife 23 operates and below which knife is receptacle box 24, which when the tobacco is being pressed in the receptacle formed by oscillating throat 19 and sides 20 by presser 26, registers with and forms a lower continuation of the receptacle so formed, 25 being the bottom or lower platform and upon which this box slides.

After the tobacco has been pressed by oscillating throat member 19 it is shoved down by presser 26 and into box 24 of predetermined density as presser 26 is regulated by spring 27.

When box 24 is properly filled, knife 23 acts, separating the box from the receptacle above, then the reception box 24 is shoved out of alinement of the receptacle and over the rolling belt 28 and in alinement with ejecting block 29, when said block 29 is forced down through said box ejecting the bunch therefrom on to the belt. A pocket or loop is positively formed in the rolling belt 28 by rolls 30 in advance of the ejecting block 29, said rollers being operated simultaneously with said block 29. This positively formed pocket receives the bunch as it is discharged from the reception box 24. Simultaneous with the discharge from the box 24 the receptacle formed in part by throat member 19 and the bottom of which is formed by knife 23 is filled.

I will now describe more in detail the operation of the parts above mentioned.

31 is the main driving shaft journaled in stand 2 and driven by any well known means; in the drawing by belt pulley 32, operating through clutch 33 on shaft 34, which clutch is controlled by foot lever and by means of pinion and gear 35 and 36. On main shaft 31 are two cams 37 and 38, cam 37 operating lever 39, which lever is fulcrumed on rod 40 and operates link 41. Cam 38 operates lever 42, which lever is fulcrumed on rod 40 and which operates link 43. Link 41 operates operating rocker shaft 44 by means of lever 47. Link 43 operates operating lever 45 which lever is fulcrumed at 46. Link 41 is normally in low position and link 43 is normally in high position, the two links alternately operating one up and the other down, etc. Operating rocker shaft 44 is journaled in main frame 1 and has on it lever 48, which lever 48 operates lever 49 by means of link 50. Lever 49 is fulcrumed at 51 and operates shaft 8 by means of lever 52 secured to said shaft and link 53. On operating rocker shaft 44 are levers 54 which operate the roller belt 28 by means of roller 55, carried by carriage 56, carriage 56 being operated by link 57 secured to levers 58 at 74, which levers 58 are fulcrumed at 59 to the main frame and in which levers 58 slidably operate levers 54.

The roller belt is of the ordinary construction, one end secured at 60 and the other end on roller 61, which roller is journaled in main frame 1 and has adjusting pin 89 controlled by adjustable guide 90, the adjustment of which guide determines the size of the pocket. On operating rocker shaft 44 is lever 62, which lever operates receptacle box 24 by means of sliding bar 63 formed into a cam or slot 64 in which lever 62 operates. On operating rocker shaft 44 is secured a lever 65 which operates knife 23 by means of sliding bar 66 having slot 67 in which lever 65 operates.

Levers 62 and 65 being substantially at right angles and from mid position lever 62 operates in cam or slot 64 in one direction, not moving the sliding box in the movement of the operating rocker shaft in one half of its movement. On operating rocker shaft 44 is lever 68 which is timed in mid or down position symmetrically with levers 62 and 65, and which lever 68 operates oscillating throat 19 through shaft 21 by means of lever 69 and link 70. On operating rocker shaft 44 is cam 71 which operates presser 26 by means of lever 72 and link 73. Link 73 is maintained in definite downward pressure by adjustable spring 27, which spring is secured to said lever 72 and is adjusted in tension by screw 75. Presser 26 is held in up position by trigger 76, which trigger is released by shaft 21 through lever 77 and slotted link 78, spring 79 tending to keep said trigger engaged. Lever 45 operates ejecting block 29 by means of sliding rods 80. On sliding rods 80 is secured connection for link 81, which link operates lever 82, which lever is fulcrumed at 83 and has spring 88 tending to keep it in downward position.

On link 82 is pivotally secured one end of link 85, the other end of which link is slotted and in which slot lever 86 operates, lever 86 being secured to the shaft 18 upon which the bottom of receptacle 15 is secured, link 85 being maintained normally in upper position by spring 88.

I have not attempted to give numbers to the minor details, such as rollers or the like. All cam operative parts being supplied with rollers.

91 is a face plate forming the opposite side of receptacle 14 from the oscillating throat member 19. 92 is a thumb screw for adjusting sides 20. 93 is a shock absorber supplied with cushion 94 to absorb the shock from lever 72 as the same drops after being released by trigger 76. Cam 71 raises lever 72 to maximum position at the extreme throw in one direction of rocker shaft 44 and trigger 78 releases lever 72 at the extreme throw of rocker shaft 44 in the other direction.

In feeding the machine, especially from a long chute the material has a tendency to pack in the feeding funnel 4, to prevent this and take the weight of the material above, plate 95 is introduced having openings therein through which the material may pass.

To prevent the material from choking or lodging, arms 96 and 97 are provided, secured to and operated by shaft 8, one below and the other above plate 95.

98 is a bridge or upper support for shaft 8 and also acts in connection with arms 96 and 97 to move the material, support 98 being relatively stationary.

Having thus described my invention what I claim and desire to secure by Letters Patent is:

1. A cigar bunching machine comprising a supply means feeding into an approximate measuring means, an approximate measuring means feeding into a forming means, a forming means forming the tobacco into an approximate degree of compactness feeding into a measuring means, a measuring means and means for separating the tobacco in the measuring means from the forming means.

2. A cigar bunching machine comprising a supply means feeding into an approximate measuring means, an approximate measuring means feeding into a forming means, a forming means forming the tobacco into an approximate degree of compactness feeding into a measuring means, a measuring means, means for separating the tobacco in the measuring means from the forming means, a rolling belt provided with means to form the same into definite position and means for discharging from the measuring means into said belt.

3. In a cigar bunching machine a plurality of measuring means provided with means for conveying tobacco between said measuring means and while being so conveyed bringing the tobacco to a predetermined degree of compactness.

4. In a cigar bunching machine a plurality of measuring means provided with means for conveying tobacco between said measuring means and while being so conveyed bringing the tobacco to a predetermined degree of compactness consisting of means for receiving the tobacco in a chamber at its end of maximum cross sectional area and means for changing said chamber while containing said tobacco to make the said end its smallest cross sectional area.

5. In a cigar bunching machine a plurality of measuring means provided with means for conveying tobacco between said measuring means and while being so conveyed bringing the tobacco to a predetermined degree of compactness, consisting of means for receiving the tobacco in a chamber at its end of maximum cross sectional area and means for changing said chamber while containing said tobacco to make the said end its smallest cross sectional area and means for compressing tobacco in said chamber to a predetermined degree and forcing the same into a measuring means.

6. In a cigar bunching machine a plurality of measuring means provided with means for conveying tobacco between said measuring means and while being so conveyed bringing the tobacco to a predetermined degree of compactness, consisting of means for receiving the tobacco in a chamber at its end of maximum cross sectional area, means for changing said chamber while containing said tobacco to make the said end its smallest cross sectional area, means for compressing tobacco in said chamber to a predetermined degree and forcing the same into a measuring means and means for separating the tobacco in said chamber from the tobacco in the measuring means into which it has been pressed.

7. In a cigar bunching machine means of bringing the tobacco therein to a definite degree of compactness, consisting of a passage provided with a movable wall on one side of said passage and means for changing said passage to reverse ends thereof in area so that the discharge end becomes the larger end and means for compressing the tobacco to a definite degree of compactness in said passage.

8. A cigar bunching machine comprising a supply means feeding into an approximate measuring means, an approximate measuring means feeding into a forming means, means for varying the capacity of said approximate measuring means, a forming means forming the tobacco into an approximate degree of compactness feeding into a measuring means, a measuring means and means for separating the tobacco in the measuring means from the forming means.

9. In a scrap bunching machine, a feeding means, a bunch approximating means, a compacting means, a bunch determining means and a bunch discharge means, coordinated as substantially enumerated.

10. In a scrap bunching machine, in timed relation a bunch approximating means automatically fed from a supply means and automatically feeding a compacting means and means for regulating said approximating means, a compacting means fed from said approximating means and means for regulating said compacting means, a bunch measuring means automatically fed from said compacting means and provided with means of separating the same from said compacting means when filled, and means for discharging the contents so separated.

11. In a scrap bunching machine, in timed relation a bunch approximating means automatically fed from a supply means and automatically feeding a compacting means and means for regulating said approximating means, a compacting means fed from said approximating means and means for regulating said compacting means, a bunch measuring means automatically fed from said compacting means and provided with means for separating the same from said compacting means when filled, and means for discharging the contents so separated, in combination with said supply means provided with a scrap regulating means comprising a scrap retainer to prevent undue packing in said feeding means and means for agitating the scrap with reference to said retaining means.

12. In a scrap bunching machine, in timed relation a bunch approximating means automatically fed from a supply means and automatically feeding a compacting means and means for regulating said approximating means, a compacting means fed from said approximating means and means for regulating said compacting means, a bunch measuring means automatically fed from said compacting means and provided with means for separating the same from said compacting means when filled, and means for discharging the contents so separated in combination with said supply means provided with a scrap regulating means comprising a scrap retainer to prevent undue packing in said feeding means and means for agitating the scrap with reference to said retaining means and a bunch rolling means fed from said measuring means comprising a rolling belt provided with means for forming a definite pocket therein to receive the bunch and means for rolling the bunch in said belt after having been placed in said pocket.

HARRY T. FROEHLICK.

Witnesses:
RALPH ROSENFELT,
FLORENCE DAVIS.